United States Patent

Shingleton et al.

[11] Patent Number: 5,975,021
[45] Date of Patent: Nov. 2, 1999

[54] CENTRIFUGAL FEED DISTRIBUTOR

[75] Inventors: Roger L. Shingleton, Sumner; Ronald E. Burnham, Kent; Jon K. Lapping, Auburn, all of Wash.

[73] Assignee: Environmental Technologies, Inc., Auburn, Wash.

[21] Appl. No.: 08/995,427

[22] Filed: Dec. 20, 1997

[51] Int. Cl.$^6$ .................................................... A01K 5/00
[52] U.S. Cl. ........................................ 119/230; 119/51.04
[58] Field of Search ............................ 119/51.04, 57.91, 119/212, 230, 242; 222/410, 372, 333

[56] References Cited

U.S. PATENT DOCUMENTS

| | | | |
|---|---|---|---|
| 3,195,508 | 7/1965 | Lehman et al. | 119/57.91 |
| 3,523,520 | 8/1970 | Evans | 119/203 |
| 4,487,370 | 12/1984 | Speicher | 222/410 |
| 4,967,697 | 11/1990 | Lau | 119/51.04 |
| 5,072,695 | 12/1991 | Newton et al. | 119/51.04 |
| 5,150,666 | 9/1992 | Momont et al. | 119/51.04 |
| 5,622,467 | 4/1997 | Pethullis | 222/410 |
| 5,702,183 | 12/1997 | Rasimus et al. | 222/410 |

*Primary Examiner*—Robert P. Swiatek
*Assistant Examiner*—Elizabeth Shaw
*Attorney, Agent, or Firm*—Delbert J. Barnard

[57] ABSTRACT

A centrifugal feed distributor or feeder (10) to distribute feed (16) in a substantially circular distribution array (58) for fish or livestock. Feeder (10) includes a domed housing (20), a fan assembly (32), and a rotating base (34). The domed housing (20) includes a substantially cylindrical sidewall (22), a closed upper end (24), and a large open lower end (26), which together define a inner chamber (28) and an exterior (30). The fan assembly (32) includes a plurality of fan blades (36) each connected to a vertical shaft (40) that rotates about a center of shaft when an external force (18) is applied to the fan blades. The shaft (40) is also connected to base (34), which rotates about shaft center at the same speed the fan blades rotate. The fan assembly (32) is positioned within domed housing chamber (28). An output gap (52) is defined by the position of the lower end (26) of the housing (20) in relationship to the rotating base (34). An inlet (66) provides a substantially tangential inflow of air and feed (16) to the inner chamber (28) near the upper end (24). The air carries the feed (16) into the inner chamber (28) and moves the fan blades (36) to drive the fan assembly (32). The feed (16) spirals downwardly around the sidewall (22) of the inner chamber (28) and is dropped onto the rotating base (34) for radial centrifugal distribution outwardly through the gap (52).

22 Claims, 3 Drawing Sheets

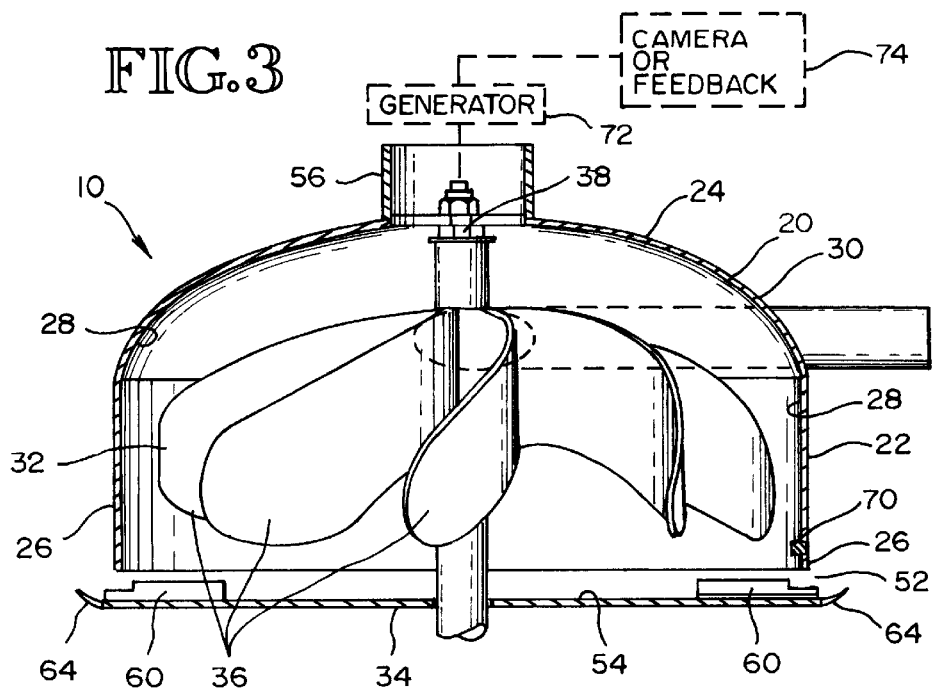
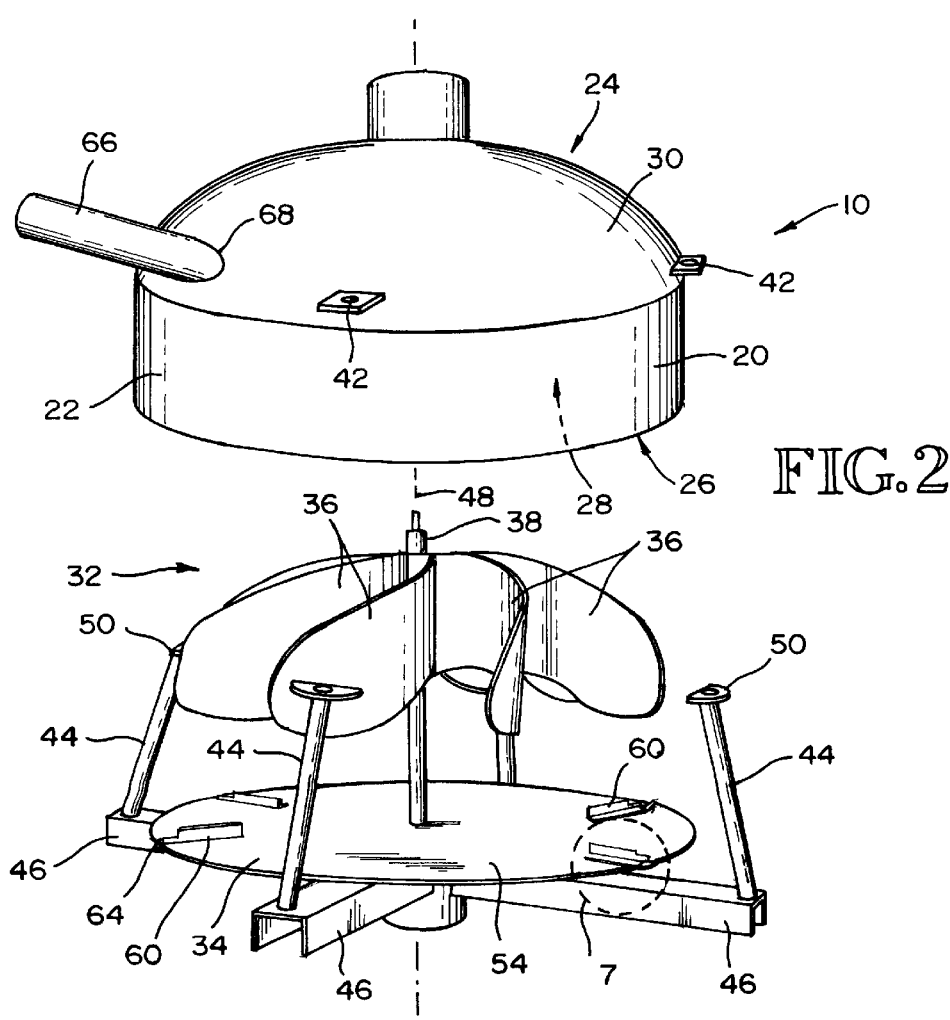

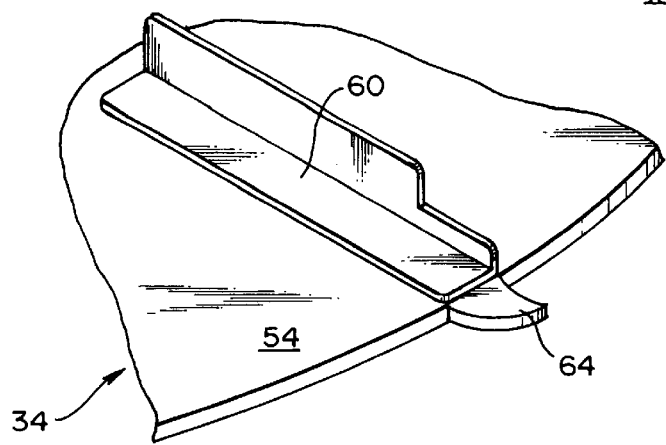
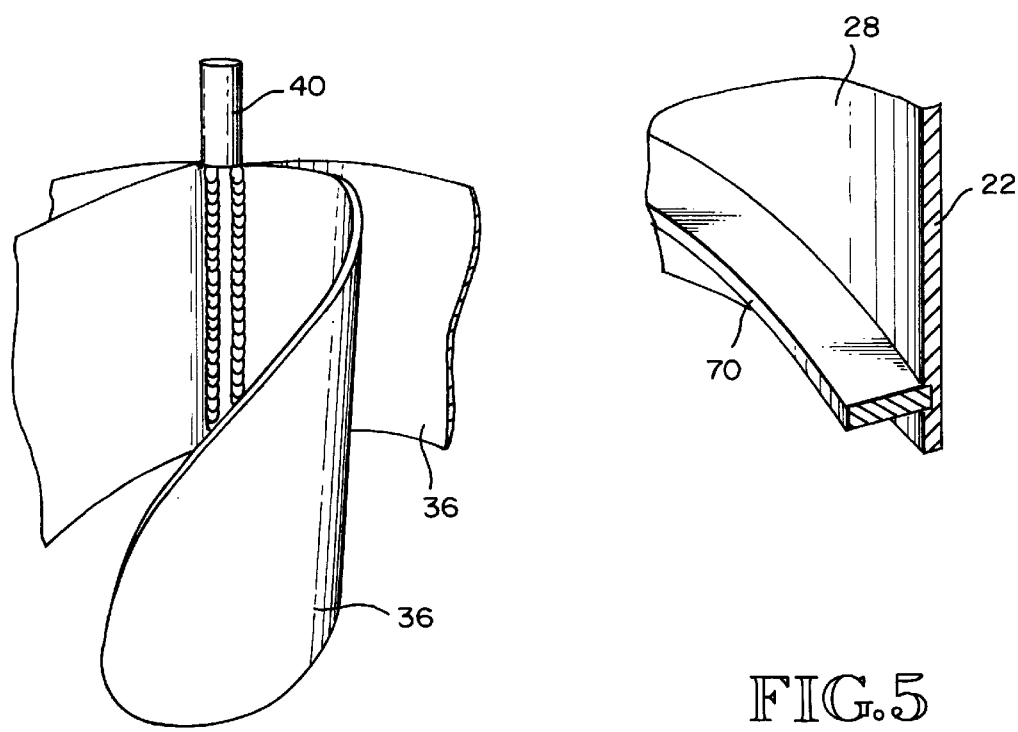
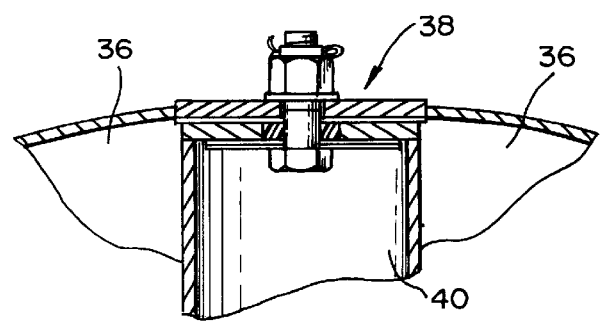

CENTRIFUGAL FEED DISTRIBUTOR

TECHNICAL FIELD

The present invention relates to centrifugal material (or feed) distributors that spread material/feed in a desired generally circular distribution array. More specifically, the present invention relates to a centrifugal feed distributor having a housing, a fan assembly, and a rotating base in which feed is forced through a gap between the rotating base and the housing for feeding a large number of fish or animals at approximately the same time.

BACKGROUND OF THE INVENTION

Because of the rapid depletion of natural fish stocks in the world's oceans, fish farms have become a booming industry. In managing fish farms, an objective is to maintain relatively equal size amongst the fish. This objective can be frustrated through traditional feeding methods where a supply of food pellets are deposited in generally one spot into the fish tank or pool. The strongest fish will fight the others for the food, thus, leaving the weaker fish with little or no food. Over time, the stronger fish, by obtaining the largest percentage of the food, grow larger than the poorly fed weaker fish.

Additionally, the feeding of the farm raised fish is by far the single largest overhead expense, typically running in the range in excess of 75%. As such, a uniform distribution food source is desired to feed all the fish at one time to raise equal size fish stock. However, current feeding methods generally break the expensive fish pellets. Once a fish pellet is broken, fish have been known to refuse to eat it. This waste becomes unacceptable to farm owners given the high overhead cost of the fish pellets. Thus, a method and device to feed a large number of fish at one time yet not breaking up the individual fish pellets is critical for the profitability of the farm owners.

DISCLOSURE OF THE INVENTION

The present invention relates to a centrifugal material or feed distributor for spreading pneumatically-conveyed material in a substantially circular distribution array. The distributor includes a housing having a substantially cylindrical sidewall, a substantially closed upper end and an open lower end, together defining an inner chamber. The inlet provides substantially tangential inflow of air and material to the inner chamber near the upper end. The fan assembly is rotatably mounted within the chamber and includes a plurality of fan blades and a rotating base plate. The rotating base plate is positioned adjacent the lower end of the housing such that an output gap is defined between the base plate and the open lower end of the housing. In use, the air inflow carries the material into the inner chamber and moves the fan blades to drive the fan assembly. The material spirals downwardly around the sidewall of the inner chamber and is dropped onto the rotating base plate for radial centrifugal distribution outwardly through the gap.

In preferred form, the housing is domed shaped. The centrifugal material distributor may also include at least one support member to support the housing fan assembly and rotating base plate. In one embodiment, a plurality of stanchions extend upwardly from the support member. Each stanchion includes a flange that is of a size and shape to closely confront and support an external corresponding flange of the housing such that the housing rests rigidly atop the support member while the rotating base and fan assembly are free to rotate.

The at least one support member may be supported by at least one floating pontoon in order to float the centrifugal material distributor atop a surface of water. This is particularly useful for feeding farm raised fish in fish cages. In another embodiment, the centrifugal material distributor may be suspended, or cantilevered, over a desired area in which feed or material is to be distributed through the use of arm connected to the housing.

In another embodiment, a plurality of malleable spaced-apart fingers that extend upwardly from the periphery of the base plate may be adjusted for controlling the radius of the circular distribution array.

In another form of the invention, the centrifugal material distributor may also include a plurality of spaced-apart flukes that extend upwardly from the upper surface of the rotating base plate. These flukes aid in aligning and controlling the circular distribution of all of the material or feed that drops onto the rotating base plate.

In another form of the invention, the centrifugal material distributor may also include a cylindrical sleeve that extends upwardly from the substantially closed upper end. In this way, the fan assembly is less likely to become entangled with any external objects.

The fan assembly and rotating base plate rotate in a range from 400–600 rpm in order to quickly distribute the feed in a matter of seconds. The present invention is also directed to the centrifugal feed distributor that includes a housing fan assembly, and rotating base plate and also includes at least one support member, a feed source and a power source in which a conduit providing forced air and feed is tangentially connected adjacent an upper end of the housing.

The present invention may also incorporate a generator that accesses and is powered by the rotating shaft of the fan assembly. The generator may be used to power an output device, such as a camera or other feedback device.

The present invention also includes a method for feeding farm raised fish in a fish tank in order to raise substantially uniform sized fish. The method includes providing a centrifugal feed distributor for spreading pneumatically-conveyed fish feed into a desired circular distribution array over the fish tank. The method also includes providing a feed source to provide fish feed to the feed distributor and providing a power source capable of providing forced air from the feed source into the feed distributor such that the air and feed enter the centrifugal feed distributor in a tangential connection. In use, the feed is distributed relatively instantly in a substantially circular array across the surface of the fish tank such that most all of the fish are fed at approximately the same time.

Advantages of the present invention includes an apparatus and a method to feed a large number of fish or livestock at substantially the same time by forcing the fish feed or other material in a substantially circular array in a matter of seconds. Another advantage includes an apparatus that provides for minimal breakage of the fish pellets.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 2 is an exploded pictorial view of the centrifugal feed distributor having a housing, a fan assembly, and a rotating base and showing schematically a generator and an output device;

FIG. 3 is a cross sectional view of the present invention taken substantially along lines 3—3 of FIG. 1;

FIG. 4 is a pictorial view of one of the fan blades;

FIG. 5 is a cross sectional view of the rotor of the fan assembly;

FIG. 6 is a pictorial view of a deflector shelf that may be added to the interior of domed upper portion to allow the pellets to rotate in a complete 360° distribution array; and FIG. 7 is an enlarged pictorial view of a fluke and a malleable finger taken substantially at circular line 7 of FIG. 2.

BEST MODE FOR CARRYING OUT THE INVENTION

Figure 1:
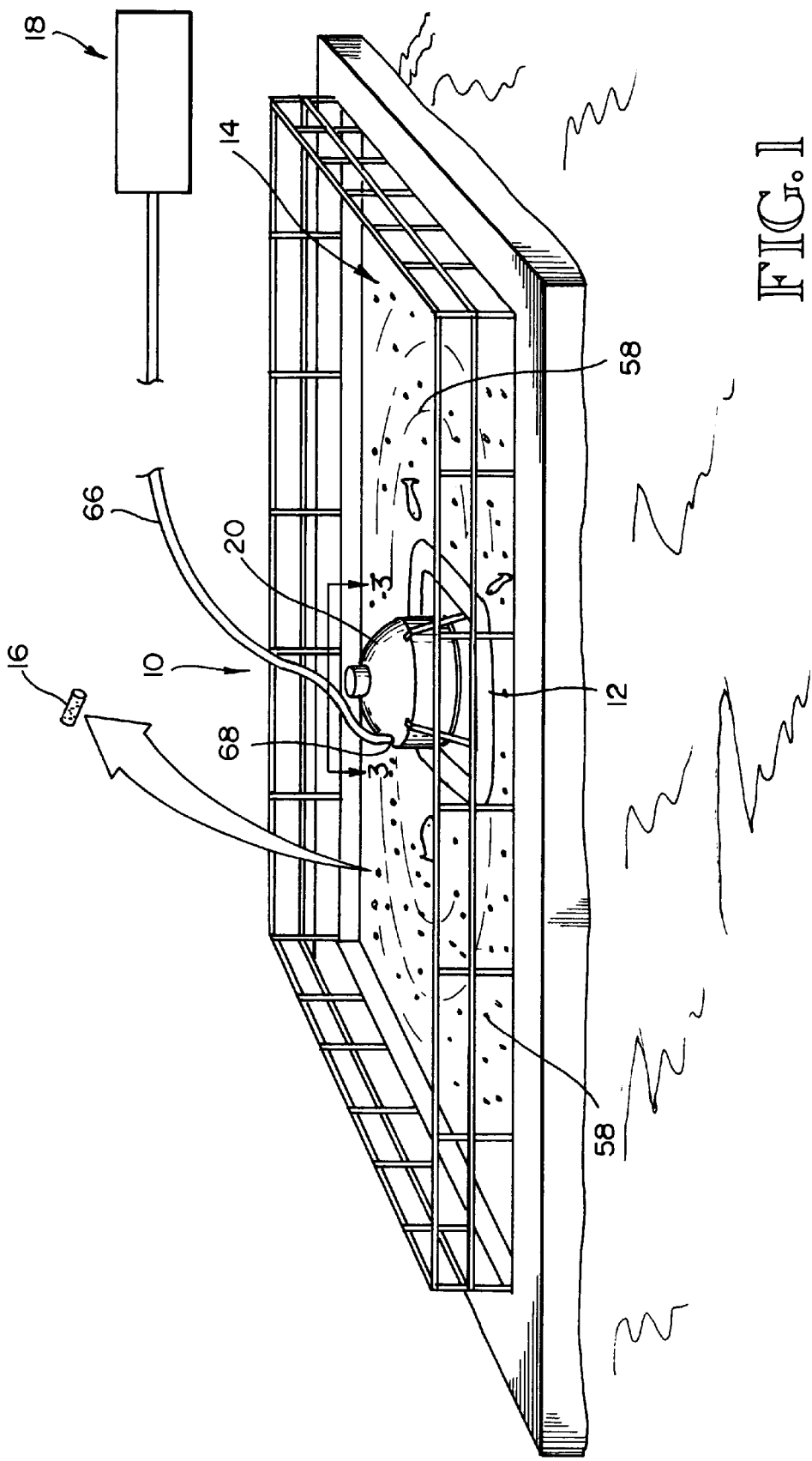
FIG. 1 is a pictorial view of the device of the present invention showing a centrifugal feed distributor in use over a fish cage and showing a detailed enlarged view of a fish pellet.

The present invention relates to a centrifugal material (or feed) distributor 10, which, in use, spreads feed in a wide circular distribution array within seconds and without damage to feed pellets. Although the centrifugal feed distributor 10 of the present invention can be used for a wide variety of feed applications, it is particularly useful for farm raised fish stocks, where food distribution must be uniformly spread out over a relatively short time in order to maintain a desired objective of uniformly sized fish stock.

Referring to FIG. 1, the centrifugal feed distributor (or feeder) 10 is shown in use resting on pontoons 12 that float atop a fish cage 14. Alternatively, the feeder 10 may also be suspended from an arm (not shown) or other mechanical device over the fish pool. A multitude of fish pellets 16 is supplied from a feed source (not shown). A power source 18 having a blower and a motor (shown in phantom) supplies the air or gas to centrifugally spread the fish pellets 16. The FEED MASTER fish feeding system by ETI of Auburn, Wash. is one such device to supply the feed and the power for the present invention.

Referring also to FIGS. 2 and 3, the feeder 10 includes a housing 20 having a substantially cylindrical sidewall 22, a substantially closed upper end 24, and a large open lower end 26. Together, the cylindrical sidewall 22, substantially closed upper end 24, and large open lower end 26 define an inner chamber 28 and an exterior 30. In preferred form, housing 20 is domed-shaped. The cylindrical shape allows the feed distribution to be generally circular.

The feeder 10 also includes a fan assembly 32, and a rotating base 34. The fan assembly 32 includes a plurality of fan blades 36. Referring also to FIGS. 5, a rotor assembly 38 including a centrally located and upright shaft 40 that supports the plurality (eight shown) fan blades 36. The rotor assembly is mounted within domed housing, adjacent the substantially closed upper end 24, but is free to rotate relative to the domed housing.

A plurality of outwardly extending external flanges 42 from exterior 30 of domed housing 20 to engage corresponding stanchions 44 extending upwardly from a plurality of support members 46 positioned below base 34. In one embodiment, the support members are crossed beams that intersect at approximately the center line 48 of the domed housing 20. Each stanchion 44 includes an upper flange member 50 of a size and shape to closely confront and support its corresponding flange 42 of domed housing exterior 30. In this manner, domed housing 20 rests atop stanchions 44 of support members 46 such that a gap 52 is defined by and between lower end 26 of domed housing 20 and the upper surface 54 of base 34 (see FIG. 3). This gap 52 is approximately a few inches, and its significance will be discussed below.

A cylindrically-shaped sleeve 56 may be added to the substantially closed upper end 24 at the top of domed housing 20 in order to shield the rotating rotor assembly 38 from potential entanglement and the corrosive effects of the environment.

Referring to FIGS. 2, 3, and 7, base 34 is connected to rotating shaft 40. Base 34 is designed to be three feet in diameter, with the housing diameter slightly larger. However, the invention encompasses other housing sizes, depending on the circular distribution array 58 desired.

Base 34 also includes a plurality of flukes 60, which extend upwardly from base surface 54. The function of the flukes will be discussed below. Extending upwardly and outwardly from the perimeter 62 of base 34 is a plurality of spaced apart upwardly-extending malleable fingers 64. These fingers 64 may be adjusted upwardly or outwardly "in the field" to change the radius (shorten or length) the circular distribution array 58.

In use, the fish pellets 16 are air blown from the FEED MASTER fish feeding system, or other source, through approximately a 2 or 3 inch flexible pipe, shown at 66, that tangentially enters the chamber 28 of domed housing 20 at or near substantially closed upper end 24, shown at 68. The tangential connection of pipe 66 to chamber 28 allows the fish pellets 16 to spiral downwardly around sidewall 22 of chamber 28. The fact that the pellets are forced to the sidewall and away from the fan blades causes less breakage of the pellets. The air forces the pellets into chamber 28 at a speed in which to rotate the fan blades in a counter clockwise direction approximately 450–500 rpms. Once the fish pellets enter into the chamber, they fall onto the rotating base 34, which is rotating at the same speed as the fan blades. Thus, the impact of the pellets hitting the rotating base is decreased as the pellets are moving at roughly the same speed as the base is rotating. The decreased impact protects the pellets from further breakage.

Once the pellets have dropped onto the base, the pellets are flung outside the housing through the gap into the circular distribution array 58. The flukes 60 help align and channel the fallen pellets to be distributed outwardly in the direction the fluke is pointing. However, because the base is rotating at 450–500 rpms, the flukes further spread the pellets in an arcuate shape. The roughly eight spaced apart flukes aid in maximizing the circular distribution array shape.

The fan blades, as shown in FIGS. 2 and 4, spread the fish pellets in approximately a 40–100 foot radius distribution array in a matter of seconds.

To avoid problems of a 270° circular array distribution, a deflector shelf 70, as shown in FIG. 6, may be added to aid in spreading the fish pellet in a complete 360° array distribution. The deflector shelf 70 is a thin wall approximately ¾ the diameter distance from the point of tangential engagement 68 that is upwardly arched in order to provide upward lift of any remaining pellets into the last 90° quadrant of the domed chamber. The deflector shelf 70 may be incorporated into the dome structure during manufacture (for example injection molding) or as a slot with a deflector shelf added external of the dome and pushed through a helical slot (not shown) inside domed chamber 28.

Referring again to FIG. 2, the rotating shaft 40 can be connected to a generator 72 (shown schematically) in order to convert the mechanical work of the rotating shaft into electrical power. The generator can, thus, supply power to an output device 74, such as a camera or other feedback device.

The feeder of the present invention spreads the fish pellets in the desired array in substantially intact (not broken form). Thus, the pellets sink within the cage at different times as the feeder continues to rotate. As the pellets sink into the pool at various depths, more fish are fed, thus addressing the goal of feeding all the fish and keeping their size uniform.

The feeder 10 is preferably made from man-made material or a non-corrosive metal, such as aluminum. If the material is man-made, the feeder would preferably be injection molded for a smoother interior finish.

The illustrated embodiments are only examples of the present invention and, therefore, are non-limitive. It is to be understood that many changes in the particular structure, materials and features of the invention may be made without departing from the spirit and scope of the invention. Therefore, it is my intention that any patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A centrifugal material distributor for spreading pneumatically-conveyed material in a substantially circular distribution array, the distributor comprising:

a housing having a substantially cylindrical sidewall, a substantially closed upper end and an open lower end, together defining an inner chamber;

an inlet providing substantially tangential inflow of air and material into the inner chamber near the upper end;

a fan assembly rotatably mounted within the chamber including a plurality of fan blades and a rotating base plate positioned adjacent the open lower end of the housing defining an output gap between the base plate and an open lower end of the housing;

wherein, in use, the air inflow carries the material into the inner chamber and moves the fan blades to drive the fan assembly, the material spirals downwardly around the sidewall of the inner chamber and is dropped onto the rotating base plate for radial centrifugal distribution outwardly through the gap.

2. The centrifugal material distributor according to claim 1, further comprising at least one support member that supports the housing, the fan assembly, and the base plate.

3. The centrifugal material distributor according to claim 2, further comprising the at least one support member resting atop a floating pontoon in order to float the centrifugal material distributor atop a surface of water.

4. The centrifugal material distributor according to claim 2, further comprising a plurality of stanchions that extend upwardly from the support member, each said stanchion including an upper flange of a size and shape to closely confront and support a corresponding flange extending outwardly and externally of said housing such that the chamber fits over the fan assembly and is positioned above the rotating base plate.

5. The centrifugal material distributor according to claim 1, wherein the housing is domed shaped.

6. The centrifugal material distributor according to claim 1, further comprising a plurality of spaced-apart flukes extending upwardly from the base plate.

7. The centrifugal material distributor according to claim 5, further comprising a plurality of malleable spaced-apart fingers extending upwardly from the periphery of the base plate.

8. The centrifugal material distributor according to claim 1, further comprising a plurality of malleable spaced-apart fingers extending upwardly from the periphery of the base plate.

9. The centrifugal material distributor according to claim 1, further comprising a cylindrical sleeve that extends upwardly from said substantially closed upper end.

10. The centrifugal material distributor according to claim 1, further comprising at least one support arm connected to the housing in order to cantilever the material distributor over a desired area in which the material is to be distributed.

11. The centrifugal material distributor according to claim 1, wherein the fan blades and rotating base plate rotate in the range of 400–600 rpm.

12. The centrifugal material distributor according to claim 1, further comprising a generator accessing the fan assembly in order to power an output device.

13. A centrifugal feed distributor to spread feed in a substantially circular distribution array, the centrifugal feed distributor comprising:

a housing having a substantially cylindrical sidewall, a substantially closed upper end and an open lower end, together defining an inner chamber;

a fan assembly rotatably mounted within the chamber including a plurality of fan blades and a rotating base plate positioned at the open lower end of the housing defining an output gap between the base plate and the open lower end of the housing;

at least one support member that supports the housing, the base plate, and the fan assembly;

a feed source providing feed;

a conduit interconnecting the feed source in the housing to provide feed from the feed source into the inner chamber of the housing, said conduit being tangentially connected near the upper end of the housing;

a power source providing forced air to move the feed from the feed source through the conduit into the inner chamber in order to move the fan blades of the fan assembly;

wherein, in use, the feed is air forced into the inner chamber and spirals downwardly around the sidewall of the inner chamber and is dropped onto the rotating base plate for radial centrifugal distribution outwardly through the gap.

14. The centrifugal feed distributor according to claim 13, wherein the housing is domed shaped.

15. The centrifugal feed distributor according to claim 13, further comprising at least one pontoon member positioned under said support members in order to float the centrifugal feed distributor atop a surface of water.

16. The centrifugal feed distributor according to claim 13, further comprising at least one support arm connected to the centrifugal feed distributor in order to cantilever the feed distributor over a desired area to which the feed is to be distributed.

17. The centrifugal feed distributor according to claim 13, further comprising a plurality of malleable spaced apart deflecting fingers extending upwardly from the periphery of the base plate.

18. The centrifugal feed distributor according to claim 13, further comprising a plurality of spaced apart flukes extending upwardly from the upper surface of the base plate.

19. The centrifugal feed distributor according to claim 18, further comprising a plurality of malleable spaced apart deflecting fingers extending upwardly from the periphery of the base plate.

20. The centrifugal feed distributor according to claim 13, further comprising a cylindrical sleeve that extends upwardly from said upper end.

21. The centrifugal feed distributor according to claim 13, further comprising a plurality of spaced apart flanges extending outwardly and externally of the housing portion that confront and are supported by a plurality of corresponding flanges that are each mounted to a stanchion which extends upwardly from the at least one support member.

22. A method of providing centrifugal feeding for farm raised fish in a fish tank in order to raise substantially uniformly sized fish, the method comprising:

providing a centrifugal feed distributor for spreading pneumatically-conveyed fish feed into a desired circular distribution array over the fish tank;

providing a feed source to provide fish feed to the feed distributor; and providing a power source to force air from the feed source into a tangential inlet into the feed distributor;

wherein, in use, the feed is pneumatically-conveyed relatively at the same time from the feed distributor in a circular distribution array across the surface of the fish tank such that most all the fish are fed at approximately the same time.

* * * * *